June 16, 1931.  E. W. PAXTON  1,809,863
APPARATUS FOR AND METHOD OF MAKING WIRE GLASS
Filed Feb. 7, 1930
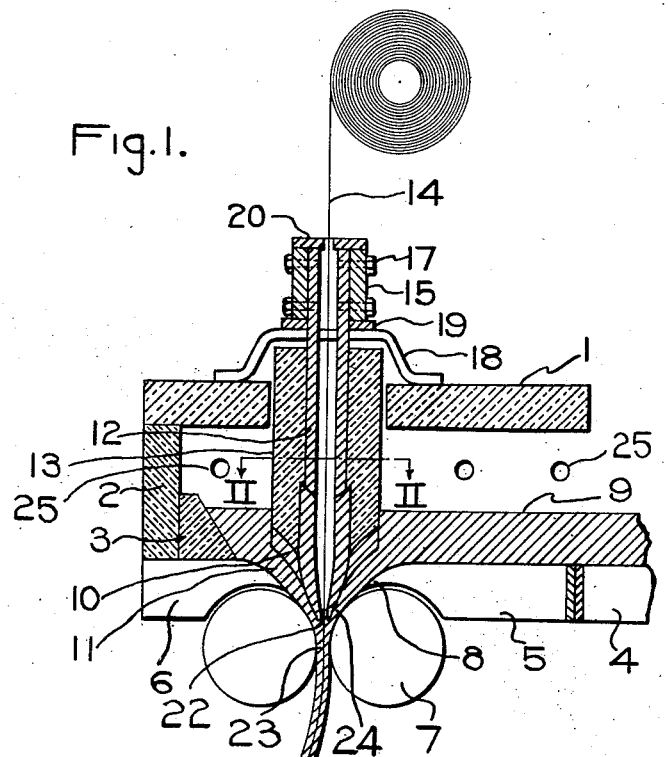
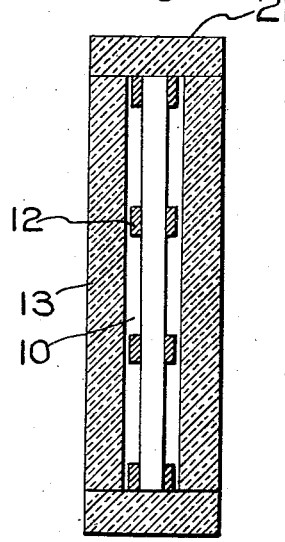
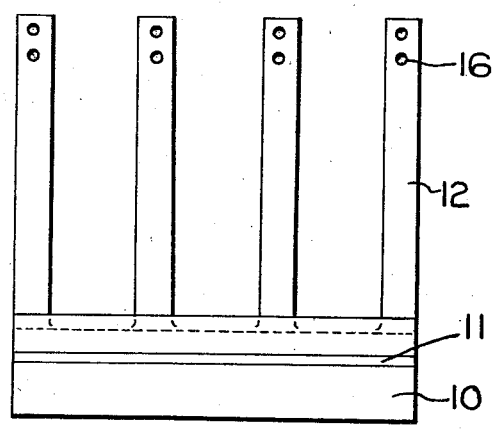
INVENTOR
Elisha W. Paxton
BY William B. Jaspert.
ATTORNEY Patented June 16, 1931

1,809,863

UNITED STATES PATENT OFFICE

ELISHA W. PAXTON, OF WASHINGTON, PENNSYLVANIA, ASSIGNOR TO HIGHLAND WESTERN GLASS COMPANY, OF WASHINGTON, PENNSYLVANIA, A CORPORATION OF DELAWARE

APPARATUS FOR AND METHOD OF MAKING WIRE GLASS

Application filed February 7, 1930. Serial No. 426,584.

This invention relates to apparatus for making wire glass by continuous process and it is among the objects thereof to provide a means for continuously feeding molten glass to a sheet forming pass between rolls and to simultaneously feed the wire into the glass.

Another object of the invention is the provision of a wire setting device which also functions to control the flow of glass to the roll pass, and which is constructed to prevent deterioration of the glass from contact with certain of its parts.

A further object of the invention is the provision of means for maintaining a reducing or non-oxidizing atmosphere in the region where the wire comes in contact with the glass.

These and other objects will become more apparent from a consideration of the accompanying drawings in which like reference characters designate like parts and in which Fig. 1 is a vertical section partially in elevation of a glass feeding and wire setting device embodying the principles of this invention; Fig. 2 a cross section taken on the line II—II, Fig. 1; and Fig. 3 a side elevational view of one of a pair of metal members employed in the construction of the wire setter.

With reference to the several figures of the drawings, 1 designates the roof of a box like structure, 2 an end wall, 3 a refractory filler block at the end furthest remote from the glass melting tank, 4 a portion of the hearth supporting a glass pool 9, and 5 and 6 adjustable blocks having reduced edges 8 cooperating with the glass sheet forming rolls 7.

A combined wire setting and flow controlling device 10 is disposed within the box adjacent the roll pass. The member 10 comprises a pair of suitable heat resisting metal members having the property of preventing chemical action with the molten glass and these members have outwardly flaring portions 11 that function to support refractory members 13 and which further cooperate with the reduced ends 8 of blocks 5 and 6, and the rolls 7 to direct and control the glass flow in the direction of the roll pass.

The members 10 are provided with straps or legs 12 which are perforated at 16 to receive bolts 17 for securing the straps to blocks 15. The wire setting device is supported by a frame 18 which is mounted on the roof 1 and blocks 19 of different thicknesses may be employed to vary the distance of the bottom gate or opening from the roll pass. A clearance space is provided in the roof 1 to permit lateral adjustment of the suspended member.

The top of the setting device or wire guide may be partially closed by a cap 20, and end pieces 21, Fig. 2, may be utilized to constitute the setting device a unitary member. Wire netting 14, commonly employed in wire glass, is disposed in the space between the members 10 and extended through the gate 22 to the glass between the pass 23 of rolls 7. The space 24 between the flared portion 11 of the metal members and the rolls 7 is regulated by the position of the setting device to control regulation of the flow of glass as desired.

Burner ports 25, or any other suitable heating means may be provided to maintain the glass at suitable working temperatures.

In the operation of the device, the glass is preferably maintained at a level above the top of the flared ends 11 of the metal members thereby preventing oxidation of the metal in the region of the glass and deterioration of the latter. By proper adjustment of the wire setting device, the space 24 may be controlled to obtain the desired glass flow in relation to wire travel, thereby preventing the wire passing through a large quantity of molten glass which would tend to detract from high quality product.

Wire netting 14 is drawn or inducted into the roll pass by the movement of the set glass leaving the roll pass. Glass is prevented from entering the space between the metal members 10 by the restricted gate 22 and also by movement of the wire. The wire is preheated while moving in the direction of the gate 22 and its oxidation may be prevented by providing a reducing or non-oxidizing atmosphere in the space or wire passage.

On account of the straps 12 and the refractory material 13, very little heat is conducted from the glass, and the metal members 10 also function to support the refractory material 13 or pieces of same in case of breakage.

It will be evident from the foregoing description of this invention that the adjustable wire guide provides for accurate control of the flow of glass thus assuring uniformly good quality of the wire glass product.

The structure as shown in Fig. 1 may be attached to or formed integrally with the glass melting tank or it may be mounted on tracks or other movable support to transfer it to or from the tank and annealing lehr.

Although one embodiment of the invention has been herein illustrated and described, it will be obvious to those skilled in the art that various modifications may be made in the details of construction without departing from the principles herein set forth.

I claim:

1. Apparatus for making wire glass comprising an enclosure for supporting a glass pool having an opening for the escape of the glass, a pair of rolls cooperating with said opening to form sheet glass and a wire guide for feeding wire to the roll pass, said guide being shaped to cooperate with said rolls to control the flow of glass to said pass.

2. Apparatus for making wire glass comprising an enclosure for supporting a glass pool having an opening for the escape of glass, a pair of rolls cooperating with said opening to form sheet glass and a wire guide for feeding wire to the roll pass, said guide being shaped complementary to the rolls and adjustably mounted to control the flow of glass to said pass.

3. Apparatus for making wire glass comprising an enclosure for supporting a glass pool having an opening for the escape of the glass, a pair of rolls cooperating with said opening to form sheet glass and a wire guide for feeding wire to the roll pass, said guide being adjustable in a vertical and lateral direction to control the flow of glass to said pass.

4. Apparatus for making wire glass comprising an enclosure for supporting a glass pool having a plurality of removable blocks forming a passage for the exit of glass from the pool, a pair of rolls cooperating with said passage and a wire guide cooperating with said rolls, said wire guide, blocks, and rolls being shaped to form a glass confining passage of decreasing width.

5. A wire guide for feeding wire to sheet glass forming rolls comprising a composite structure of metal and refractory material, said metal being shaped to form a supporting member for the refractory material and to constitute a gate for the passage of wire therethrough.

6. Apparatus for making wire glass comprising a support for a pool of molten glass having an exit for glass from the pool and a wire guide in cooperative relation with said exit, said guide having metal and refractory parts in contact with the glass pool and so proportioned that the glass contacting parts of the metal are submerged in said pool.

7. Apparatus for making wire glass comprising a support for a pool of molten glass having an exit of glass from the pool and a wire guide consisting of a pair of metal members forming a gate at one end and having extending portions of relatively small cross sectional area supported at their upper ends and having refractory material supported on said metal members.

8. Apparatus as set forth in claim 7 in which the wire guide is adapted to be filled with a reducing or non-oxidizing atmosphere to prevent or control oxidation of the wire passing therethrough.

In testimony whereof I have hereunto set my hand this 6th day of February, 1930.

ELISHA W. PAXTON.